Dec. 13, 1960 R. M. HAUSCH 2,964,365

PISTON AND CONNECTING ROD ASSEMBLY

Filed Dec. 5, 1956

R. M. HAUSCH
INVENTOR.

BY E. C. McRae
J. R. Faulkner
T. H. Oster

ATTORNEYS

United States Patent Office 2,964,365

Patented Dec. 13, 1960

2,964,365

PISTON AND CONNECTING ROD ASSEMBLY

Raymond M. Hausch, Dearborn, Mich., assignor to Ford Motor Company, Dearborn, Mich., a corporation of Delaware Filed Dec. 5, 1956, Ser. No. 626,342

4 Claims. (Cl. 309—20)

This invention lies in the mechanical field and is specifically concerned with an assembly of a piston and a connecting rod adapted for use in reciprocating machinery such as compressors and internal combustion engines.

This invention has been specifically perfected to enable piston and connecting rod assemblies particularly adapted for light or medium duty apparatus to be produced and assembled rapidly and economically. An automotive refrigeration compressor is a typical application of this structure.

Figure 1:
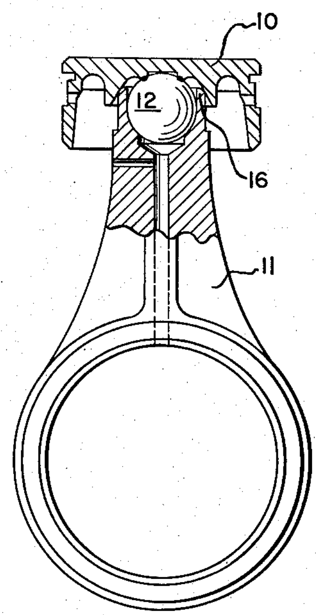
Figure 3:
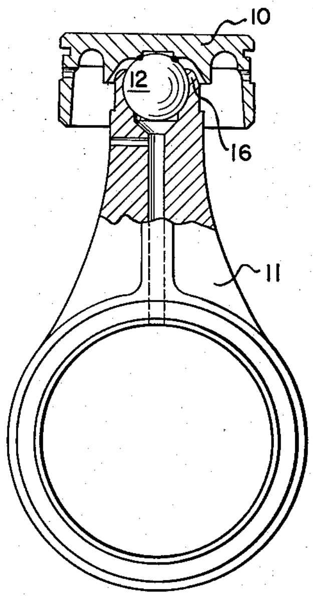
Figure 2:
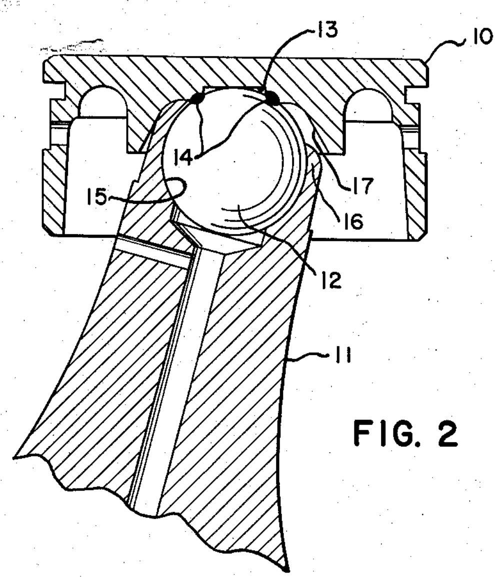

This invention will be described in connection with the figures of drawing in which Figure 1 is an elevational view partially in section of the piston and connecting rod assembly at an early stage of the assembly and, Figure 2 is a similar showing of the assembly at a later stage in the operation and, Figure 3 is a similar showing of the completed piston and connecting rod assembly.

Referring to each of the figures of drawing the assembly will be seen to comprise a piston 10 and a connecting rod 11. Prior to assembly of piston 10 and connecting rod 11 a spherical member 12 is securely welded as by resistance welding to piston 10 to facilitate this welding operation. Piston 10 is provided with a central depression 13 and spherical member 12 is welded to edges 14 of central depression 13. It will be noted that central depression 13 is sufficiently deep so that the spherical member 12 may be welded to edges 14 without interference between the spherical member 12 and the bottom of central depression 13.

Connecting rod 11 terminates the spherical cavity 15 which has a radius appropriate for the accommodation of spherical member 12. From a consideration of Figure 1 it will be seen that initially spherical cavity 15 terminates in a cylindrical portion 16 which has a diameter sufficiently large to pass the maximum diameter of spherical member 12.

In the assembly operation, piston 10 to which spherical member 12 has been welded, is brought in proximity to connecting rod 11 and spherical member 12 is passed through cylindrical portion 16 and bottomed in spherical cavity 15.

While so assembled piston 10 is firmly clamped in one member (not shown) and connecting rod 11 is securely clamped in another member (not shown) with the axis of connecting rod 11 making a smaller angle with the plane of piston 10 than will ever occur in service. It will be noted that the connecting rod assembly is received in conical pocket 17 of piston 10. Connecting rod 11 is now rotated with reference to piston 10 and a heavy axial pressure is applied to connecting rod 11 as it rotates. This causes a spinning action to take place and forces cylindrical portion 16 radially inwards and produces the structure shown in Figure 3, in which that portion of connecting rod 11 which was originally cylindrical portion 16 has been spun over by contact with conical pocket 17 so that it firmly embraces spherical member 12 and unites piston 10 and connecting rod 11 into a secure assembly capable of resisting all the stresses which it will meet in service.

I claim as my invention:

1. An assembly of a piston and a connecting rod comprising a piston having a central depression, a spherical member supported upon the edge of said central depression and securely welded to such edge, and a connecting rod terminating in a spherical cavity in which said spherical member is received, an integral portion of the spherical cavity adjacent the piston being spun over the spherical member to prevent separation of the connecting rod and piston under tensile forces exerted upon the connecting rod by the piston.

2. An assembly of a piston and a connecting rod comprising a piston including a conical pocket, a spherical member which is securely welded to the piston within the conical pocket, and a connecting rod terminating in a spherical cavity in which said spherical member is received, an integral portion of the spherical cavity adjacent the piston being spun over the spherical member to prevent separation of the connecting rod and piston under tensile forces exerted upon the connecting rod by the piston.

3. An assembly of a piston and a connecting rod comprising a piston having a central depression and a conical pocket, a spherical member supported upon the edge of said central depression and securely welded to such edge, and a connecting rod terminating in a spherical cavity in which said spherical member is received, an integral portion of the spherical cavity adjacent the piston being spun over the spherical member to prevent separation of the connecting rod and piston under tensile forces exerted upon the connecting rod by the piston.

4. A piston and connecting rod assembly comprising a piston, a ball having a portion of its spherical surface in contact with the underside of the piston and welded to the underside of the piston, a connecting rod having an integral end portion circumferentially enveloping a sufficient amount of the ball member to resist the separation of the connecting rod and piston under tensile forces exerted upon the connecting rod by the piston and being freely pivotable upon said ball member.

References Cited in the file of this patent

UNITED STATES PATENTS

| | | |
|---|---|---|
| 1,434,904 | Mansfield | Nov. 7, 1922 |
| 1,449,034 | Calaway | Mar. 20, 1923 |
| 1,762,541 | Blowers | June 10, 1930 |
| 2,216,987 | Rose | Oct. 8, 1940 |
| 2,500,669 | Doeg | Mar. 14, 1950 |

FOREIGN PATENTS

| | | |
|---|---|---|
| 508,158 | France | July 17, 1920 |